(12) United States Patent
Fu et al.

(10) Patent No.: US 8,922,829 B2
(45) Date of Patent: Dec. 30, 2014

(54) USING A PARETO FRONTIER TO FIND AN OPTIMAL COLOR SOLUTION FOR SPOT CALIBRATION

(75) Inventors: Lina Fu, Webster, NY (US); Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 285 days.

(21) Appl. No.: 13/253,660

(22) Filed: Oct. 5, 2011

(65) Prior Publication Data

US 2013/0088729 A1  Apr. 11, 2013

(51) Int. Cl.
  G06F 15/00  (2006.01)
  G03F 3/08   (2006.01)
  H04N 1/60   (2006.01)
  H04N 1/54   (2006.01)

(52) U.S. Cl.
  CPC ... *H04N 1/60* (2013.01); *H04N 1/54* (2013.01)
  USPC .............................. 358/1.9; 358/518

(58) Field of Classification Search
  None
  See application file for complete search history.

(56) References Cited

U.S. PATENT DOCUMENTS

| | | | |
|---|---|---|---|
| 6,934,053 B1 | 8/2005 | Mestha et al. | |
| 7,379,206 B2 * | 5/2008 | Gartstein et al. | 358/1.9 |
| 2009/0033970 A1 * | 2/2009 | Bray et al. | 358/1.13 |
| 2010/0053709 A1 * | 3/2010 | Minami et al. | 358/518 |
| 2010/0085587 A1 * | 4/2010 | Hayward et al. | 358/1.9 |
| 2010/0096133 A1 | 4/2010 | Cowan | |
| 2011/0013206 A1 | 1/2011 | Mestha et al. | |
| 2011/0026053 A1 | 2/2011 | Gil et al. | |
| 2011/0149311 A1 | 6/2011 | Mestha et al. | |
| 2011/0149313 A1 | 6/2011 | Mestha et al. | |

OTHER PUBLICATIONS

Yoshi Ohno, "CIE Fundamentals for Color Measurements", Proceedings IS&T NIP16 Int. Cont. on Digital Printing Technologies, pp. 540,545, (Oct. 2000).
Sharma, et al., "The CIEDE2000 Color-Difference Formula", Color Research and Application, vol. 30, No. 1, (Feb. 2005).
Hyvarinen, et al., "Independent Component Analysis: Algorithms and Applications", Neural Networks Research Centre, Helsinki University of Technology, Finland, Neutral Networks, pp. 1-31, 13(4-5); 411-430, 2000.

(Continued)

*Primary Examiner* — Tammy Pham
*Assistant Examiner* — Frantz Bataille
(74) *Attorney, Agent, or Firm* — Philip E. Blair; Fleit Gibbons Gutman Bongini & Bianco P.L.

(57) ABSTRACT

What is disclosed is a method for determining a color solution which achieves color objectives for a color marking device involves performing the following. In one embodiment, N objectives of interest are identified for a color marking device and a N-dimensional Pareto Front is constructed which comprises a collection of color solutions which accommodates those objectives. The Pareto Front is constructed using an optimization process based upon printer models of the objectives. Color solutions can be at least one color recipe, or a combination of color recipes and process actuators. A target point is selected in an N-dimensional objective space based upon at least one user-selected preference. The target point is then mapped to a point on the Pareto Front. The mapping identifies one of the color solutions which, in turn, is used to generate a spot color for the device. The generated spot color achieves the user-selected preference.

8 Claims, 14 Drawing Sheets

(56) References Cited

OTHER PUBLICATIONS

Jean-Francois Cardoso, "Blind signal separation: statistical principles", pp. 1-16, (Official Version published as: Proceedings of the IEEE, vol. 9, No. 10, pp. 2009-2025, Oct. 1998).

Diehl, et al., "Influence Diagrams With Multiple Objectives and Tradeoff Analysis", IEEE Transactions on Systems, Man, and Cybernetics—Part A: Systems and Humans, May 2004, pp. 293-304, vol. 34, No. 3.

Littlewood, et al., "Pareto-Optimal Formulations for Cost versus Colorimetric Accuracy Trade-Offs in Printer Color Management", ACM Transactions on Graphics, pp. 132-175, vol. 21, No. 2, Apr. 2002.

Wu et al., "Optimal Spot Color Recipes Using Variable GCR Profiles", U.S. Appl. No. 12/902,669, filed Oct. 12, 2010.

Gil et al., "Attribute Driven Gamut Mapping Via a Minimized Multi-Objective Cumulative Cost Function", U.S. Appl. No. 12/942,414, filed Nov. 9, 2010.

* cited by examiner

| ID | TARGET LAB | | |
|---|---|---|---|
| | $L^*$ | $a^*$ | $b^*$ |
| 1 | 38.62 | -0.58 | -4.06 |
| 2 | 35.63 | 0.16 | -4.30 |
| 3 | 38.10 | 2.60 | 4.38 |
| 4 | 42.22 | 0.31 | -4.21 |
| 5 | 37.73 | -1.95 | 3.36 |
| 6 | 40.43 | 4.22 | 4.68 |
| 7 | 34.81 | 6.05 | 3.10 |
| 8 | 35.07 | -3.37 | -4.74 |
| 9 | 47.17 | -0.57 | -3.49 |
| 10 | 42.16 | 0.36 | -6.13 |
| 11 | 47.22 | -1.66 | 3.04 |
| 12 | 50.07 | 0.38 | -4.27 |
| 13 | 23.01 | 0.42 | 0.66 |
| 14 | 48.30 | 2.52 | 3.95 |
| 15 | 46.17 | 4.03 | 4.28 |
| 16 | 29.57 | -3.04 | -2.25 |
| 17 | 46.08 | 5.51 | 2.31 |
| 18 | 28.02 | 8.31 | 0.75 |
| 19 | 44.56 | -2.34 | -8.58 |
| 20 | 47.50 | -0.27 | 14.40 |

FIG. 11

| | $\Delta E_{2000}$ | NMF |
|---|---|---|
| MaxK | 1.92 | 26.55 |
| PF1 | 0.87 | 22.75 |
| PF2 | 0.9 | 20.24 |
| PF3 | 0.90 | 16.20 |
| PF4 | 1.35 | 14.02 |
| 4x4 | 1.19 | 16.70 |
| VGCR | 1.28 | 13.76 |

⇧ VISUAL MATCH
⇩ SMOOTH

FIG. 12

USING A PARETO FRONTIER TO FIND AN OPTIMAL COLOR SOLUTION FOR SPOT CALIBRATION

TECHNICAL FIELD

The present invention is directed to systems and methods which simultaneously optimize multiple user-selected objectives to determine a best color solution for spot color calibration of a color marking device.

BACKGROUND

To meet customer demand, the commercial printing industry requires the capability of producing spot colors and color images accurately and consistently. In a typical four color CMYK printer, when rendering a given color (Lab) on a CMYK printer, such as for spot color emulation, there is a range of CMYK values that will produce the desired Lab value. The available CMYK range is large for some colors (e.g., mid-tone neutrals) and small or zero for others (e.g., saturated colors). Although each CMYK value in the range will produce the desired Lab value, the printed spot colors with that recipe can differ widely in other attributes, such as graininess, mottle, color stability, ink cost, etc. Consequently, it is desirable to pick the CMYK recipe from among available recipes to optimize image quality. It can be computationally intensive to compute all possible CMYK recipes for a given color, select among these, and then configure the document reproduction device accordingly to a set of device-specific settings to achieve the desired image quality.

Moreover, an optimized CMYK recipe is considered useful when it not only produces accurate color but also renders colors that appear smoother (less noisy). It can be a challenging problem to determine the optimal CMYK recipe for target colors to achieve desired effects in multiple aspects, especially for the colors near the neutral axis. Customers often want to see accurate and smooth reproduction of color, as well as color match under different viewing conditions. Efforts have been made to improve smoothness of printed color patches. Some methods focus on single-objective optimization while others address multi-objective optimization based on weight assignments. Multi-objective optimization problems are often transformed into a single-objective optimization by assigning weights to the objectives. Finding a good set of weights is not trivial. It can be challenging for users to determine adequate weight distributions before initiating an optimization, especially for unskilled practitioners. Such a determination requires experience on the subject and a deep understanding of the effect of the weights on the respective objectives. Another approach is to set one objective as a primary objective and convert the remainder of objectives into appropriate constraints. Both techniques suffer from the fact that the customers have to decide the weight distribution or the constraints before initiating the optimization process and that only one solution is generated from the process.

Accordingly, what is needed in this art is increasingly sophisticated systems and methods for effectuating multi-objective optimization by providing users with a collection of optimal solutions to accommodate a range of user preferences in a manner where the selection of choices is easily understood and can be readily managed by customers.

INCORPORATED REFERENCES

"Spectral Matching Guide For Spot Color Print Applications", U.S. patent application Ser. No. 12/645,850, by Mestha et al.

"Color Inconstancy Guide For Spot Color Print Applications", U.S. patent application Ser. No. 12/645,832, by Mestha et al.

"Reference Color Difference Quantity Guide For Spot Color Applications", U.S. patent application Ser. No. 12/645,875, by Mestha et al.

"Reducing Noise Induced By Color Mixing Spot Color Recipe Search", U.S. patent application Ser. No. 12/581/566 by Mestha et al.

"Optimal Spot Color Recipes Using Variable GCR Profiles", U.S. patent application Ser. No. 12/902,669 by Wu et al.

"Attribute Driven Gamut Mapping Via A Minimized Multi-Objective Cumulative Cost Function", U.S. patent application Ser. No. 12/942,414 by Gil et al.

"Adaptive Illumination Independent Matching Of Out Of Gamut Spot Colors Using Various Gamut Mapping Techniques", U.S. Patent Publication No. 20110026053, by Gil et al.

"Adaptive Illumination Independent Matching Of Spot Colors", U.S. Patent Publication No. 20110013206, by Mestha et al.

"*CIE Fundamentals for Color Measurements*", Yoshi Ohno, Proceedings IS&T NIP16 Intl. Conf. on Digital Printing Technologies, pp. 540-545, (October 2000).

"*The CIEDE2000 Color-Difference Formula*", Gaurav Sharma, Wencheng Wu, and Edul. N. Dalal, Color Research and Application, Vol. 30. No. 1, (February 2005).

BRIEF SUMMARY

What is disclosed is a novel system and method for optimizing multiple conflicting objectives for spot color calibration using a Pareto Frontier. The present method takes into consideration several different objectives of interest such as, for instance, visual color match, smoothness, spectral match, and the like, and utilizes the Pareto Frontier to provide solutions which accommodate an array of user-selected preferences. A graphical user interface (GUI) is utilized such that the user can visually make a trade-off between different objectives and select a preferred solution. The present system and method matches color in the spectral space in addition to the CIE color difference metrics to improve the visual color match of the reproduced colors. Unlike in prior art methods, various objectives that customers are interested in such as, for example, smoothness, are taken into account through multi-objective optimization. The teachings hereof provide a spot color calibration framework that not only efficiently incorporates individual user preference but also provides a user friendly interface with abilities to select appropriate optimization (i.e., smoothness v/s spectral match). Several embodiments are disclosed which illustrate different approaches to visualize the connections and trade-offs among diverse objectives and to aid in the user decision process in choosing an optimal recipe which accommodates their selected preferences.

In one example embodiment, the present method for determining a color solution which achieves color objectives for a color marking device involves performing the following. First, N objectives of interest are identified for a color marking device and a N-dimensional Pareto Front is constructed which comprises a collection of color solutions which accommodate those objectives. The objectives of interest may be, for example, a visual color match, mottle, graininess, color stability, metamerism, ink cost, color difference, and spectral match. The Pareto Front is constructed using an optimization process based upon printer models of the objectives. Color solutions can be at least one color recipe, or a combination of color recipes and a process actuator. A target point is selected in an N-dimensional objective space based upon at least one user-selected preference. The target point is then mapped to a point on the Pareto Front. The mapping identifies one of the color solutions which, in turn, is used to generate a spot color for the color marking device. The generated spot color achieves the user-selected preference.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 11 shows Table 1 of target spot colors discussed with respect to the performance results of the methods disclosed herein;

FIG. 12 shows Table 2, i.e., average $\Delta E_{2000}$ and NMF values across 20 spot colors;

DETAILED DESCRIPTION

Figure 1:
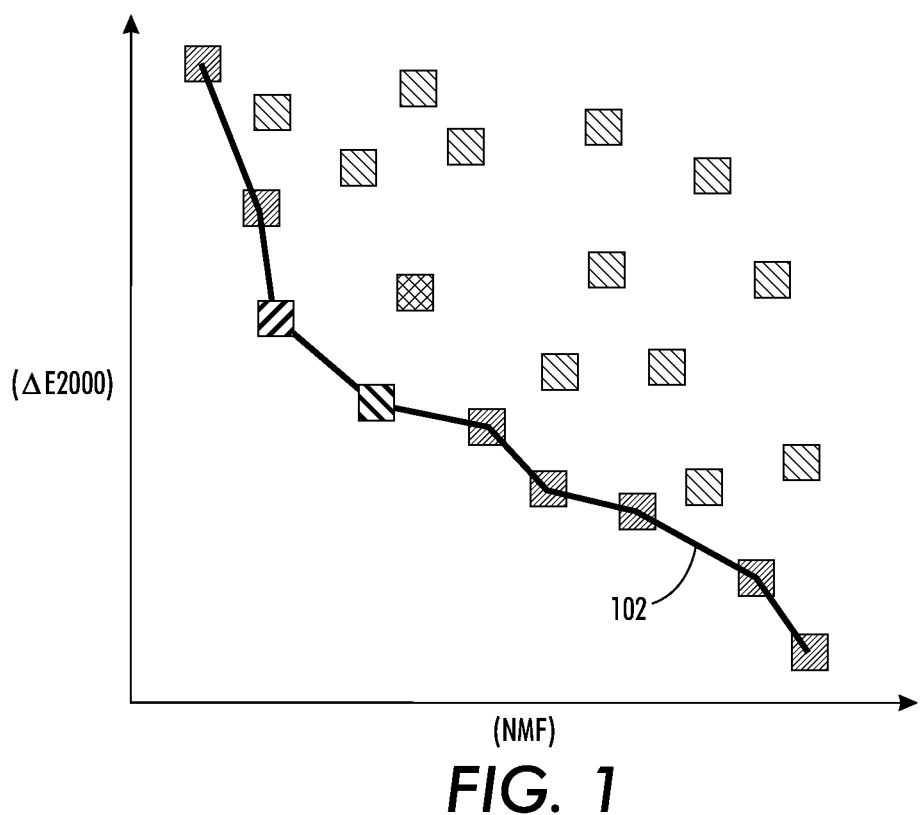
FIG. 1 shows an example N-dimensional Pareto Front (N=2) constructed for two example objectives of interest: color difference ($\Delta E_{2000}$), and smoothness (NMF)

What is presented is a method which matches color in the spectral space in addition to the CIE color difference metrics so as to improve the accuracy of reproduced colors and reduce the dependence of color match on light sources. Secondly, other objectives that might appeal to customers are taken into account for the purposes of multi-objective optimization. The focus hereof is to develop a spot color calibration framework that not only can efficiently incorporate individual user preferences but also provide a visual representation for the user/customer. The concept of Pareto Front is adopted herein to provide a collection of optimal solutions which accommodate a wide scope of achievable user-selected preferences. Several examples which utilize a Pareto Front to visualize the connection or trade-offs among the objectives and to aid in user decision process in choosing the optimal recipe to meet their preferences are provided. Algorithms for generating a Pareto Front are more fully disclosed in several of the above-incorporated references.

It should be understood that one of ordinary skill in this art would be readily familiar with many facets of color science such as, but not limited to, color recipes, color calibration, and other related techniques and algorithms commonly found in the color science arts. Those of ordinary skill would be familiar with the text: "*Digital Color Imaging Handbook*", ISBN-13: 9780849309007, and "*Control of Color Imaging Systems: Analysis and Design*", ISBN-13: 9780849337468, both of which are incorporated herein in their entirety by reference. Moreover, one of ordinary skill would also be familiar with multi-objective optimization and Pareto Frontiers. Those of ordinary skill would be familiar with the subject matter discussed in: "*Interactive Decision Maps: Approximation and Visualization of Pareto Frontier*", ISBN-13: 9781402076312, and "*Multiobjective Optimization: Principles and Case Studies*", ISBN-13: 9783540401827, also incorporated herein in their entirety by reference.

Non-Limiting Definitions

A "Device-Dependent Color Space" is a color space which is related to CIE XYZ through a transformation that depends on a specific measurement or color reproduction device. An example of a device-dependent color space is monitor RGB space or printer CMYK space.

A "Device-Independent Color Space" is any non-singular transformation from XYZ color space to another color space. This transformation in no way depends on any measurement or color reproduction device. CIE XYZ tristimulus color space is one example of a device-independent color space. Other common device-independent color spaces are CIE L*u*v*, CIE L*a*b*, and LCH, which are obtained from XYZ using non-linear transformations which are well understood in this art. For non-linear transformations pertinent to device-independent color spaces, see: Appendix A.6.1 of the above-referenced text: "*Control of Color Imaging Systems: Analysis and Design*".

A "printer model" converts values in a device-dependent color space to values in a device-independent color space for a target marking system. A printer model can have the form of a look-up table (LUT) such as a 4-D LUT for CMYK printer, or a parameterized fitted function such as a polynomial that relates inputs in device-dependent color space to outputs in device-independent color space.

A "user-selected preference" can be any preference that a user has with respect to their selected objectives of interest given a particular color marking device and customer print/copy job requirements. For example, minimizing a color difference may be preferred over graininess in a customer's particular print/copy job.

A "target point in N-dimensional objective space" is a point in the N-dimensional objective space, reflecting desired values in each objective dimension. One such target point is shown at 201 of 3-dimensional Pareto Front of FIG. 2.

A "spot color" is any color generated by an ink (pure or mixed) that can be printed using a single run. Spot colors are used to reproduce colors that are difficult to produce using standard inks. Known spot color classification systems include: Pantone®, Toyo, DIC, ANPA, GCMI, and HKS. A common standard reference for spot color work is Pantone®. For calibration purposes, spot color proofs are typically supplied by manufacturers in the form of colored samples which can be separated and individually measured against printed test patches.

"Process colors" are colors which are used in n-color print processes. A widely used 4-color print process is composed of: Cyan (C), Magenta (M), Yellow (Y), and Black (Key), commonly referred to as CMYK. More advanced hexachromatic processes are composed of six colors wherein additional colors have been added in an effort to compensate for the often inefficient reproduction of faint tints using only four colors. For example, a six color CMYKOG print process adds Orange (O) and Green (G).

A "color recipe" defines a specific combination of process colors which can be used to emulate a spot color.

A "color solution", as used herein, refers to at least one color recipe, and at least one color recipe and at least one process actuator.

An "actuator" is a controller or device element such as, for example, a corotron or scorotron wire voltage or a scorotron grid voltage ROS power, or development bias voltage, which is adjustable such that a measurement received from an ESV (electrostatic voltmeter), ETAC, densitometer, colorimeter, or spectrophotometer, is driven toward a voltage target value or set point. Adjusting an actuator setting or otherwise changing the actuator's operating point, darkens or lightens an image by controlling the amount of toner deposited on the surface of a media substrate in any of a plurality of different colors.

A "process parameter" refers to a device setting used to adjust or otherwise modify one or more operational processes, controllers, or workflows for color management in a digital document reproduction device. Example process parameters include: photoreceptor voltages (charged and/or discharged voltages), donor and/or magnetic roll voltages, fuser temperature, transfer current, and toner concentration.

A "process set point" refers to one or more process parameters which regulate the operational function of a marking engine in a color marking device. The actual available color gamut for a particular image forming device depends on colorants of the pigments and is also a function of the set points for certain process parameters of each of the color separations. Combinations of set points thus define limits to the color gamut of the device by limiting the developed color combinations that are available from specific mass levels of each of the primary colorants.

A "device configuration setting", as used herein, refers to process parameters and process set points.

An "objective of interest" is an image quality property desired to be achieved for a particular color marking device. The set of objectives of interest includes at least two of: visual color match, graininess (micro-uniformity), mottle (macro-uniformity), color stability, metamerism, ink cost, color difference, and spectral match.

"Visual color match" are visually perceptible pseudo-random defects which may arise, for instance, from a non-uniform LED imager, contamination of voltage elements in the charger, and the like.

"Color difference" refers to a device's ability to reproduce colors under various illuminants. Color difference focuses on appearance under specific illuminants and can be expressed using well known color difference equations. These calculations can be performed across a variety of illuminants with one of them acting as a reference.

"Metamerism" is the change in color difference between a pair of samples. Metamerism occurs because each type of cone in the eye responds to the cumulative energy from a broad range of wavelengths so that different combinations of light across all wavelengths can produce an equivalent receptor response and the same tristimulus values or color sensation. The magnitude of metamerism can be measured by a change in $\Delta E$ CMC for a sample pair between two illuminants. A metameric pair could have a $\Delta E$ CMC=0 in a first light and a high $\Delta E$ CMC in a second light. Metameric pairs should match under a reference condition but mismatch under a test condition. The degree of metamerism is a measure of the degree of mismatch under the test condition.

A "Metameric Index" (MI) can be generally defined as the metric to evaluate the degree of metamerism wherein two reflectance spectra differ at only within a single narrow wavelength band. The spectral curves of two closely matching, non-metameric samples are nearly identical. In many cases, the pair of samples achieves a close match under the reference condition. One of ordinary skill will appreciate that parametric correction can be used to adjust the pair of spectral curves before calculation of the Metameric Index. In one example embodiment, the y-axis of FIGS. 2 and 8, for instance, would be labeled MI (for Metameric Index) instead of $\Delta E2000$.

"Spectral Match" is a measure of how well the measure spectral reflectance of a printed target color and a spot color proof match. Spectral match can be quantified using metrics such as, for example, metameric index.

"Mottle" refers to undesirable non-uniformity of color on an output print. Such irregularities may be due, for example, to defective toner transfer from the belt to the image forming surface. ISO-13660:2001 defines mottle as the Standard Deviation (STD) of Optical Density (OD) between $1.27 \times 1.27$ mm$^2$ and $12.7 \times 12.7$ mm$^2$ scale over a defined spatial frequency. Xerox defines NMF, a measure of mottle, as the standard deviation of L* (together with an OD correction) between $1.1 \times 1.1$ mm$^2$ and $5.5 \times 5.5$ mm$^2$ scale.

"Graininess" is the aperiodic fluctuation of density at a spatial frequency in all directions. Other definitions exists such as with different spatial frequency ranges and measuring fluctuations at different color space (e.g., L* rather than density). "Color stability" or "color variability" or "color consistency" is a measure of output color variation for a given device-dependent color specification over one or more of: time, across different output devices, and/or across different portions of an output image. Each device-dependent color specification has a color stability value for each color of interest. Different color stability values are able to be determined for a particular device-dependent color specification to reflect, for example, within image color stability and within job color stability. Color stability values for a particular device-dependent color specification can be determined for different images that were created at respective times that contain that particular device-dependent color specification and that are separated by various amounts of time and/or various amounts of intervening images having been produced. Color stability is also able to be characterized for an individual printer or for a family or other population of printers. Color instability is attributable to such factors as photoreceptor or charging device variability, variation in temperature or humidity, age of the photoreceptor unit, age of an individual toner color, variability in toner developability on photoconductor, transfer or fusing process variability, or other like environmental and/or mechanical factors. In addition, changes in media weight or mechanical alignment of machine components may result in color-to-color registration errors which can impact color stability.

A "color marking device" or "multi-function device" generally refers to digital document reproduction devices known in the arts capable of rendering an image to a viewable form. Such a device includes: printers and copiers, newspaper and book publishing print systems, photographic reproduction equipment, image capturing devices such as facsimile, scanners, cameras, and the like, to name a few. Such devices generally provide a graphical user interface (UI) such, for example, as a CRT or LCD, and further provide a means for user interaction using, for instance, a keyboard, keypad, touchpad, and/or mouse. Although this term is used herein to generally refer to document reproduction devices, it should be understood that the term multi-function device is intended to encompass a wide variety of devices which can be placed in digital communication over a network with one or more computer platforms and/or with other multi-function devices. It should be understood that one or more functions, features, or capabilities of a computer workstation may reside within a multi-function device.

Brief Introduction to a Pareto Frontier

"Pareto optimality" is a concept named after Vilfredo Pareto, an Italian economist, who used the concept in his studies of economic efficiency and income distribution. Given an initial allocation of goods among a set of individuals, a change to a different allocation that makes at least one individual better off without making any other individual worse off is called a Pareto improvement. An allocation is Pareto efficient or Pareto optimal when no further Pareto improvements can be made. Pareto efficiency is a minimal notion of efficiency and does not necessarily result in a socially desirable distribution. The Pareto Front is useful in that, by restricting attention to a set of choices that are Pareto efficient, one can make tradeoffs within this set, rather than considering the full range of every parameter. Pareto selection uses a dominance concept for selection to eliminate inferior solutions.

Figure 2:
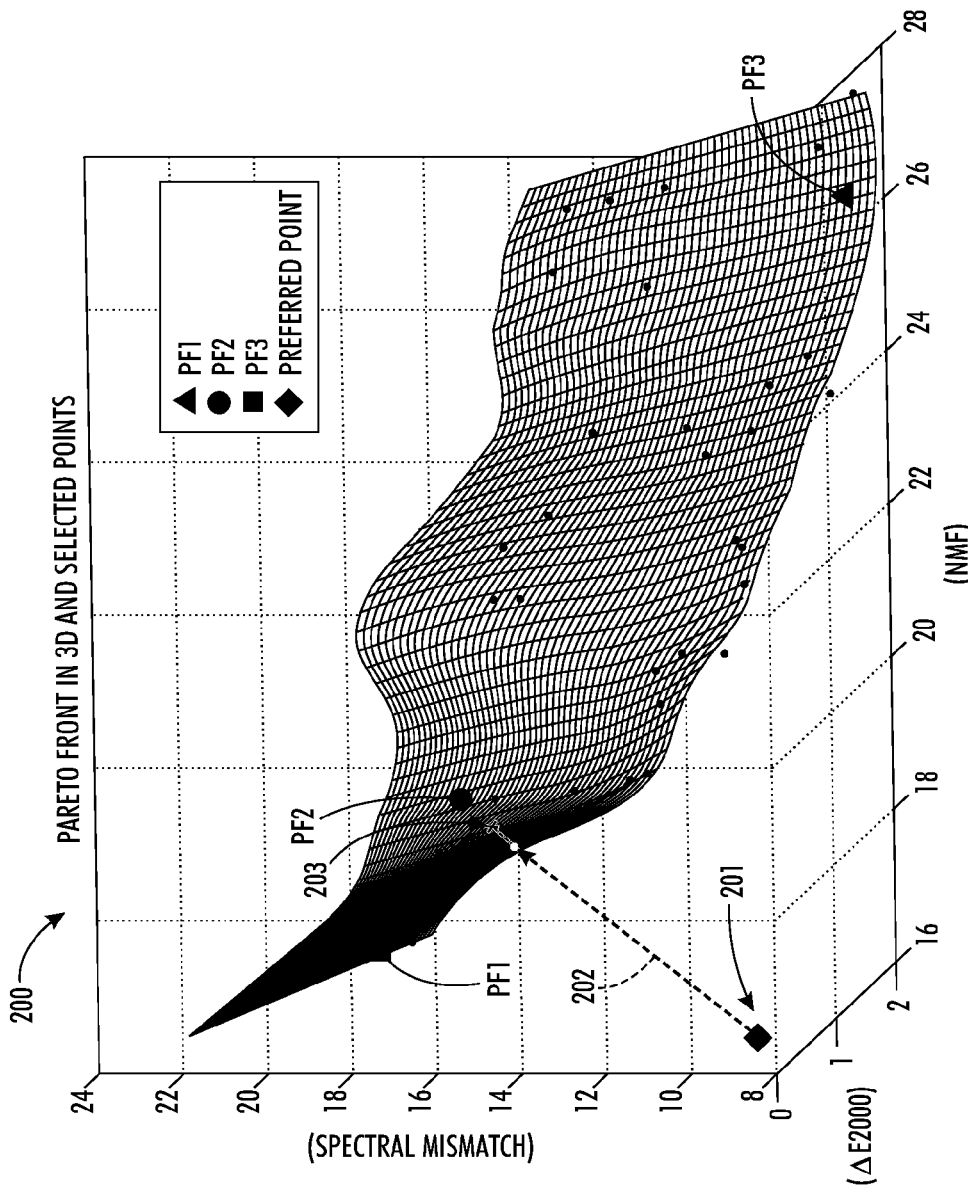
FIG. 2 shows an example N-dimensional Pareto Front (N=3) constructed for the objectives of interest: spectra mismatch, color difference ($\Delta E_{2000}$), and smoothness (NMF)

A "N-dimensional Pareto Frontier" or "Pareto Front" is a set of choices in an N-dimensional objective space that are Pareto efficient in light of a defined method of evaluation of those choices. For the purposes hereof, an N-dimensional Pareto Front comprises a collection of color solutions which accommodate the objectives of interest. The Pareto Front is utilized herein to present a collection of optimal color solutions instead of a single optimal color solution. Upon visual examination of the trade-offs, a customer selects from the displayed collection a color solution which best meets their objectives. FIG. 1 shows a two dimensional Pareto Front (at 102). FIG. 2 shows a three dimensional Pareto Front.

A Pareto Frontier can be defined as follows. Consider a design space with n real parameters, and for each design space point there are m different criteria by which to judge that point. Let $f: \mathbb{R}^n \to \mathbb{R}^m$ be the function which assigns, to each design space point x, a criteria space point $f(x)$. This represents the way of valuing the designs. Now, it may be that some designs are infeasible so let X be a set of feasible designs in $\mathbb{R}^n$, which must be a compact set. Then the set which represents the feasible criterion points is $f(X)$, the image of the set X under the action of $f$. Call this image Y. Construct the Pareto Frontier as a subset of Y, the feasible criterion points. It can be assumed that the preferable values of each criterion parameter are the lesser ones, thus minimizing each dimension of the criterion vector. Then compare criterion vectors as follows. One criterion vector y strictly dominates (or is preferred to) a vector y* if each parameter of y is no greater than the corresponding parameter of y*. At least one parameter is strictly less if $y_i \leq y_i^*$ for each i and $y_i < y_i^*$ for some i. This is written as y>y* to mean that y strictly dominates y*. Then, the Pareto Frontier is the set of points from Y that are not strictly dominated by another point in Y. Formally, this defines a partial order on Y, namely the product order on $\mathbb{R}^m$, (i.e., the induced order on Y as a subset of $\mathbb{R}^m$), and the Pareto Frontier is the set of maximal elements with respect to this order.

"Constructing the Pareto Front" can be performed using a genetic algorithm (GA). As explained herein in further detail, the final Pareto Front is used to enable a user to visually examine a set of generated solutions such that the user can make a selection among conflicting objectives subject to a set of user-selected preferences and configure the multi-function device accordingly to meet their print/copy job objectives. FIG. 2 shows the 3D Pareto Front constructed for the desired optimization objectives of: reflectance spectra mismatch, color difference ($\Delta E_{2000}$), and smoothness in terms of noise mottle frequency (NMF). Thus:

$$J_1 = J(R - R_t).$$

$$J_2 = \Delta E_{2000}.$$

$$J_3 = NMF.$$

The multi-objective optimization of CMYK recipes would be formulated as follows:

$$[CMYK]_{opt} = \min_{CMYK}\{J_1, J_2, J_3\}.$$

Ink cost and/or other relevant image quality criteria such as graininess and color stability can be included as additional constraints in the optimization process. Since the optimization process is computationally expensive, it is recommended that optimization be performed offline based on printer models to generate initial CMYK recipes, and then Automated Spot Color Editor (ASCE) feedback-based iterations in the printing process used to correct any model inaccuracies and temporal and environmental variations of printers. The printer inversion algorithm generates a set of candidate CMYK recipes from which the Pareto Front can then be extracted and approximated.

Example Networked Print/Copy Job Environment

Figure 3:
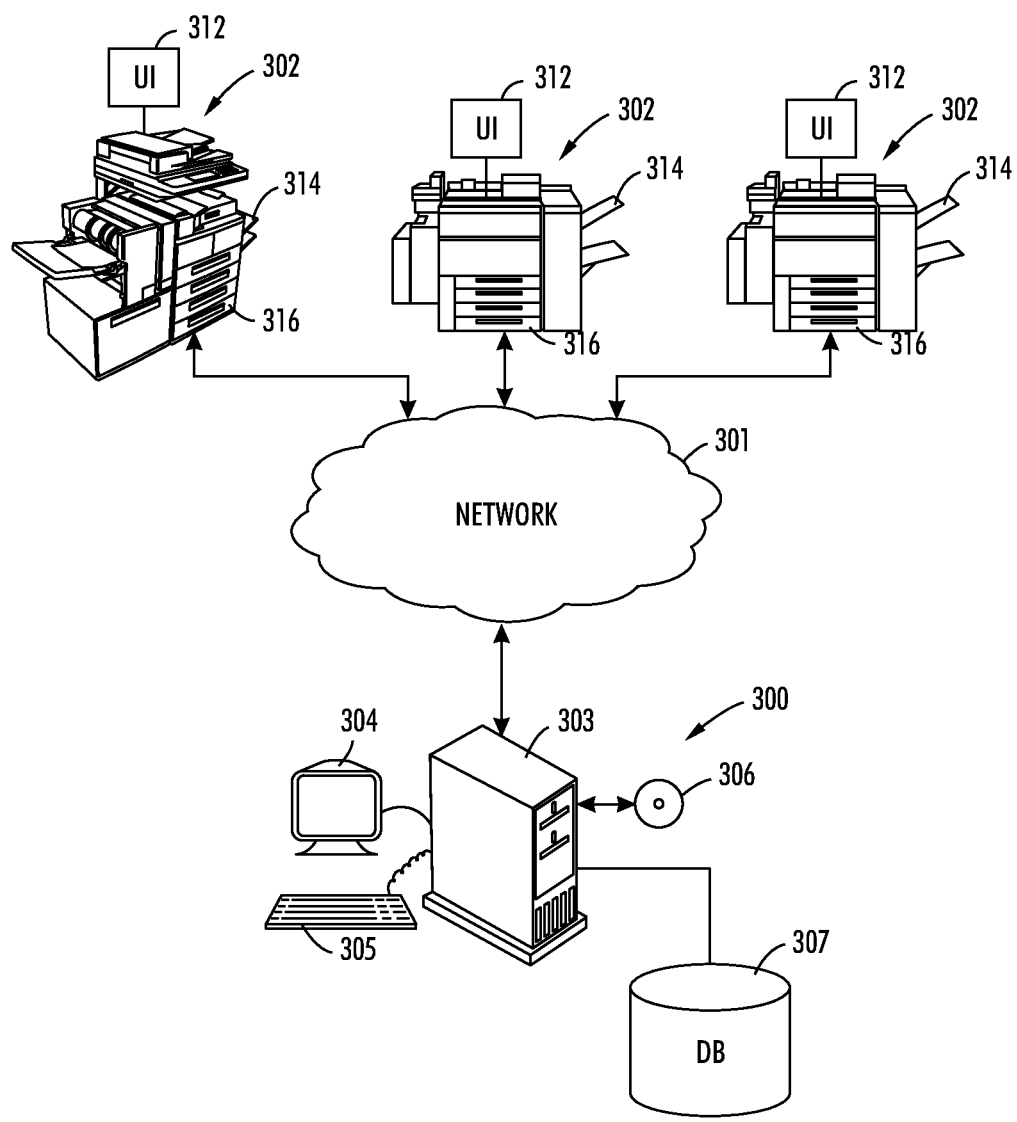
FIG. 3 illustrates one embodiment of a networked print/copy job environment wherein various aspects of the teachings hereof are likely to find their uses.

Reference is now made to FIG. 3 which illustrates one example embodiment of a networked print/copy job environment wherein various aspects of the teachings hereof are likely to find their uses.

Computer workstation 300 is shown in communication with a plurality of multi-function devices 302 over a network 301 shown as an amorphous cloud. Techniques for placing computers in networked communication with multi-function devices are well established. Computer case 303 houses various computer components such as, for example, a motherboard w/CPU and memory, storage devices, a graphics card, a sound card, a network card, a CD/DVD R/W device, to name a few. Computer 300 also includes a touchscreen display 304, alphanumeric keyboard 305, and a mouse (not shown) for visual display of the Pareto Front and for accepting a user input. Computer program product 306 provides storage, and further contains machine executable instructions for implementing the functionality and features discussed herein. The computer's CPU is capable of executing machine executable program instructions. Workstation 300 includes an interface (internal to case 303) that forwards data over a communication bus to a communications routing device to network 301. The computer includes a hard disk drive and/or a removable storage which reads and writes to storage media 306 such as a floppy disk, magnetic tape, optical disk, CD-ROM, DVC, etc., capable of storing software, programs, database files, utility programs, and other data. Computer system 300 is in communication with database 307 wherein various device configuration records are stored. Example device configuration settings stored as records in the database are shown and discussed herein further with respect to FIG. 10. Records stored in database 307 can be retrieved, modified, and updated by any of the multi-function devices 302. A record is a data structure capable of containing information which can be searched and retrieved in response to a query from the database engine. Although computer system 300 is shown comprising a conventional desktop computer, it may be a laptop, mainframe, handheld device such as an iPad, Blackberry, or a cellular phone. Any of the features of functionality of the methods disclosed herein may be effectuated by any of these devices by one or more installable applications.

Multi-function devices 302 include a user interface (UI) 312 whereon user-selectable menu options in the form of icons, tabs, pull-down menus, and the like, are displayed to effectuate a selection by a user. UI 312 is shown as a touchscreen display comprising a touch-capacitance surface for accepting a user input. The UI may further include a keyboard, keypad, mouse, and the like, (not shown). Devices 302 generally include a processor, memory, storage media, and a communications link. The multi-function devices include a document input tray 314 and output paper trays 316 for retaining output prints. Such networked multi-function devices are capable of performing a print/copy job function as is generally understood by practitioners in the digital document reproduction arts. Each of the multi-function devices is shown in communication with workstation 300 via network 301. One of ordinary skilled would appreciate that various device components (internal to a particular device) can be configured to a set of device configuration settings to change output print job quality. Some or all of the teachings hereof may be implemented partially or fully in hardware operating in conjunction with machine executable program instructions in communication with various components of any of the devices 302.

Figure 4:
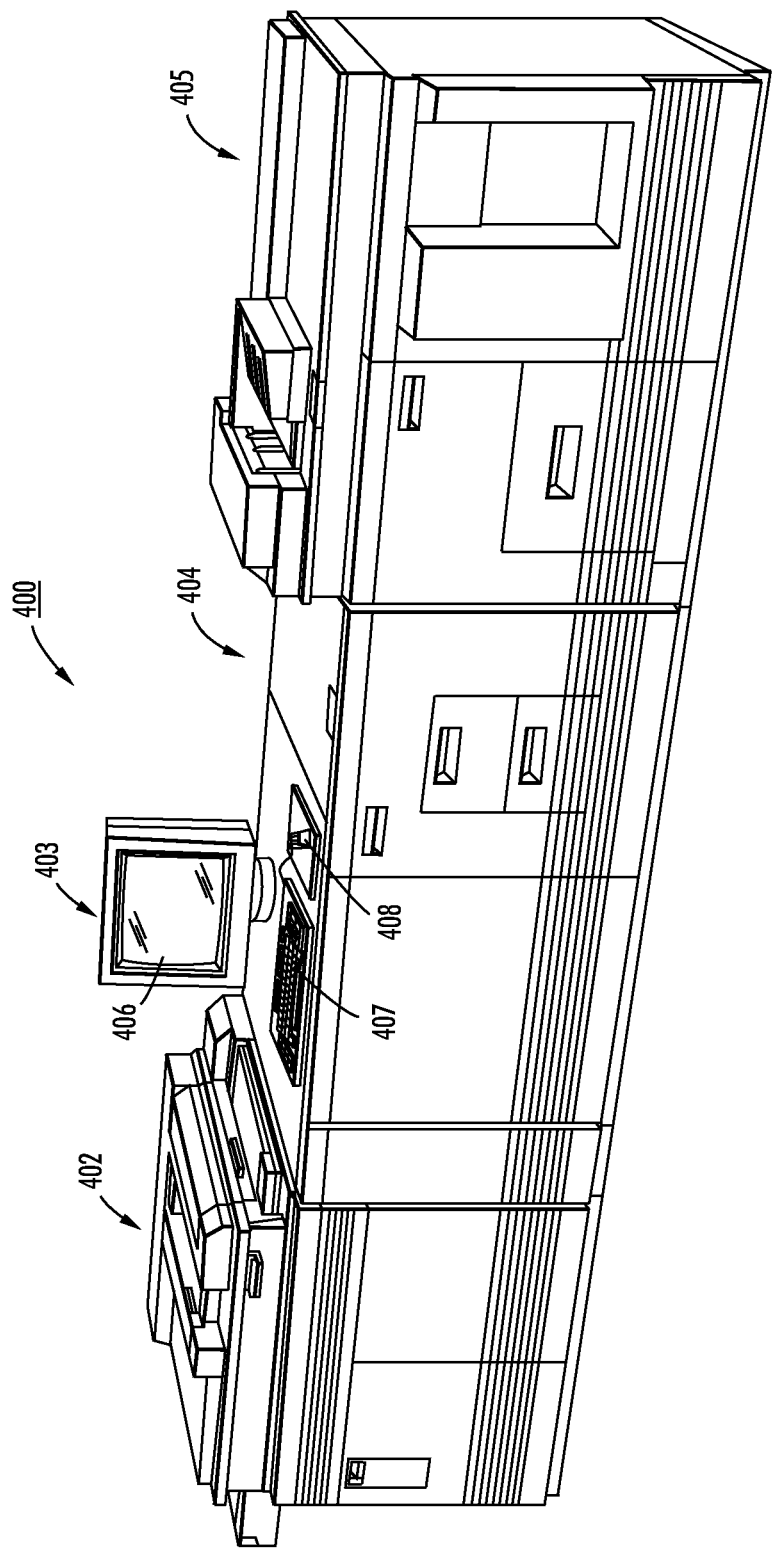
FIG. 4 illustrates an embodiment of one of the multi-function devices of the networked environment of FIG. 3.

Reference is now being made to FIG. 4 which illustrates a different embodiment of a multi-function device of the networked print/copy job environment of FIG. 3. Document reproduction system 400 is shown generally comprising an input device 402 such as a scanner, a workstation 403, a print engine compartment 404, and a discharge area 405 wherein finished documents are deposited for retrieval. Workstation 403 is shown comprising a display 406, keyboard 407 and mouse 408, which collectively enable an operator to view the Pareto Front and make various selections in accordance with the methods hereof, and to configure system 400 to a set of device configuration settings identified as part of a color solution. Print engine compartment 404 contains one or more print engines which include processors and controllers for regulating the application of inks or toners onto a print media as well as to control the media's movement through the printer module for proper registration in multi-channel color printing. Such processors and controllers may comprise actuators. System 400 includes a network connection (not shown) for placing the system in communication with any of the devices of FIG. 3. All or portions of the teachings hereof may be implemented partially or fully in hardware in conjunction with machine executable instructions in communication with various components of system 400.

Example Graphical Displays

Figure 5:
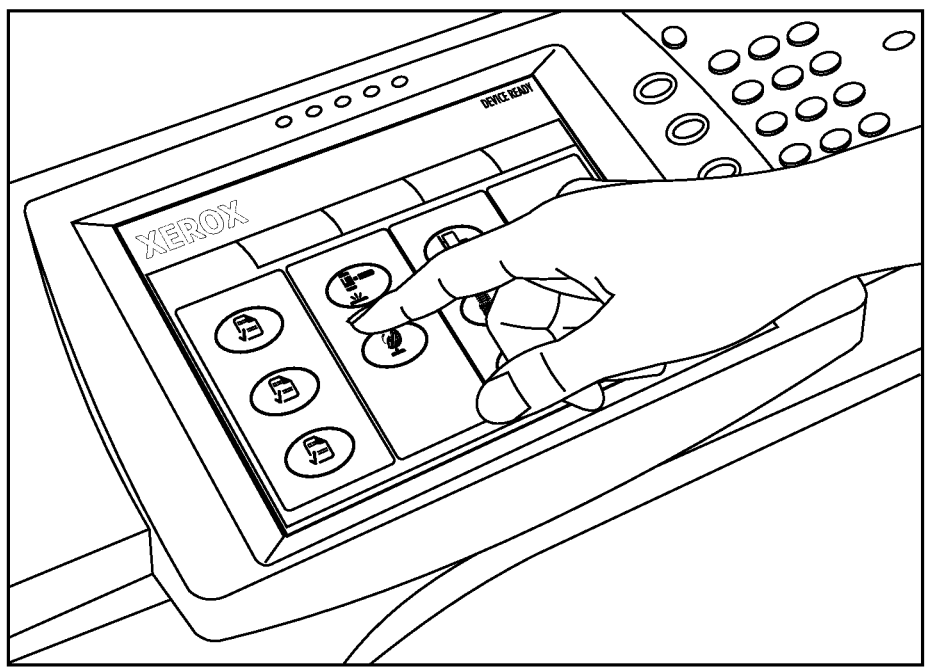
FIG. 5 shows an example display of selectable menu options and icons which may appear on the touchscreen displays of any of the devices of FIGS. 3 and 4.

Reference is now being made to FIG. 5 which shows an example display (UI) of user-selectable menus and icons displayed on any of the devices of FIGS. 3 and 4. In the embodiment of the UI display shown, there are selectable tabs each having a plurality of selectable icons and menu options for selecting user objectives, device configuration settings, and the like, in accordance with the teachings hereof. The UI's programmable touchscreen can display menu options in a variety of formats such as, for instance, tabs, icons, buttons, a data entry portion, and other widgets. Each icon may be configured to provide a visual representation of the functionality being selected thereby. Alphanumeric text may also be associated with an icon. The touchscreen UI may incorporate browser functions for displaying content retrieved from the world wide web. The specific function being performed by any of the icons will depend on the specific implementation of the teachings hereof. It will be appreciated that any of the menu options displayed on the UI may comprise a navigable hierarchy of other menu options.

Figure 6:
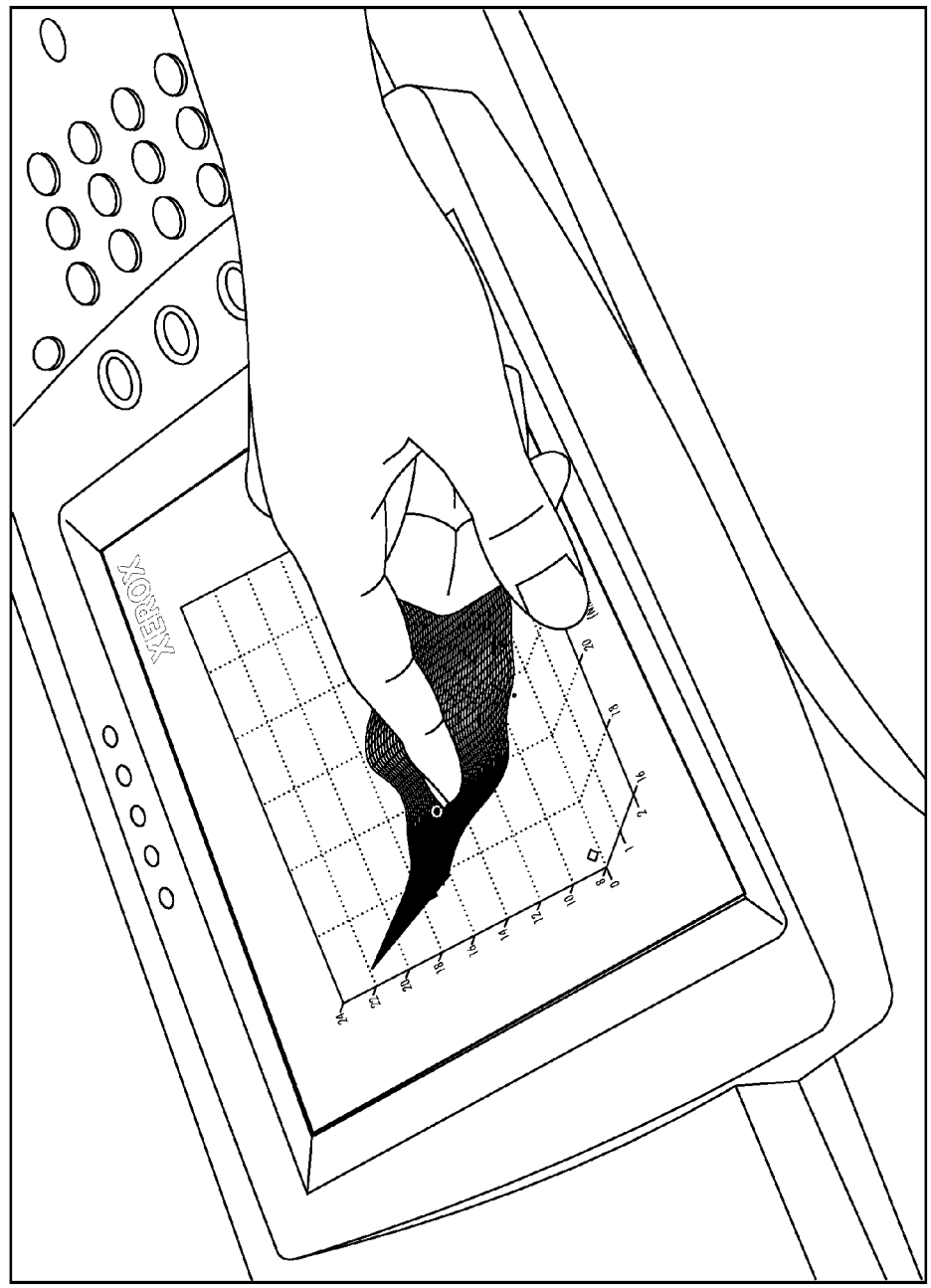
FIG. 6 shows an example display of a user manipulating the Pareto Front of FIG. 2 on the graphical displays of any of the devices of FIGS. 3 and 4.

Reference is now being made to FIG. 6 which shows an example display of a user manipulating the Pareto Front of FIG. 2 on the graphical displays of any of the devices of FIGS. 3 and 4.

Figure 8:
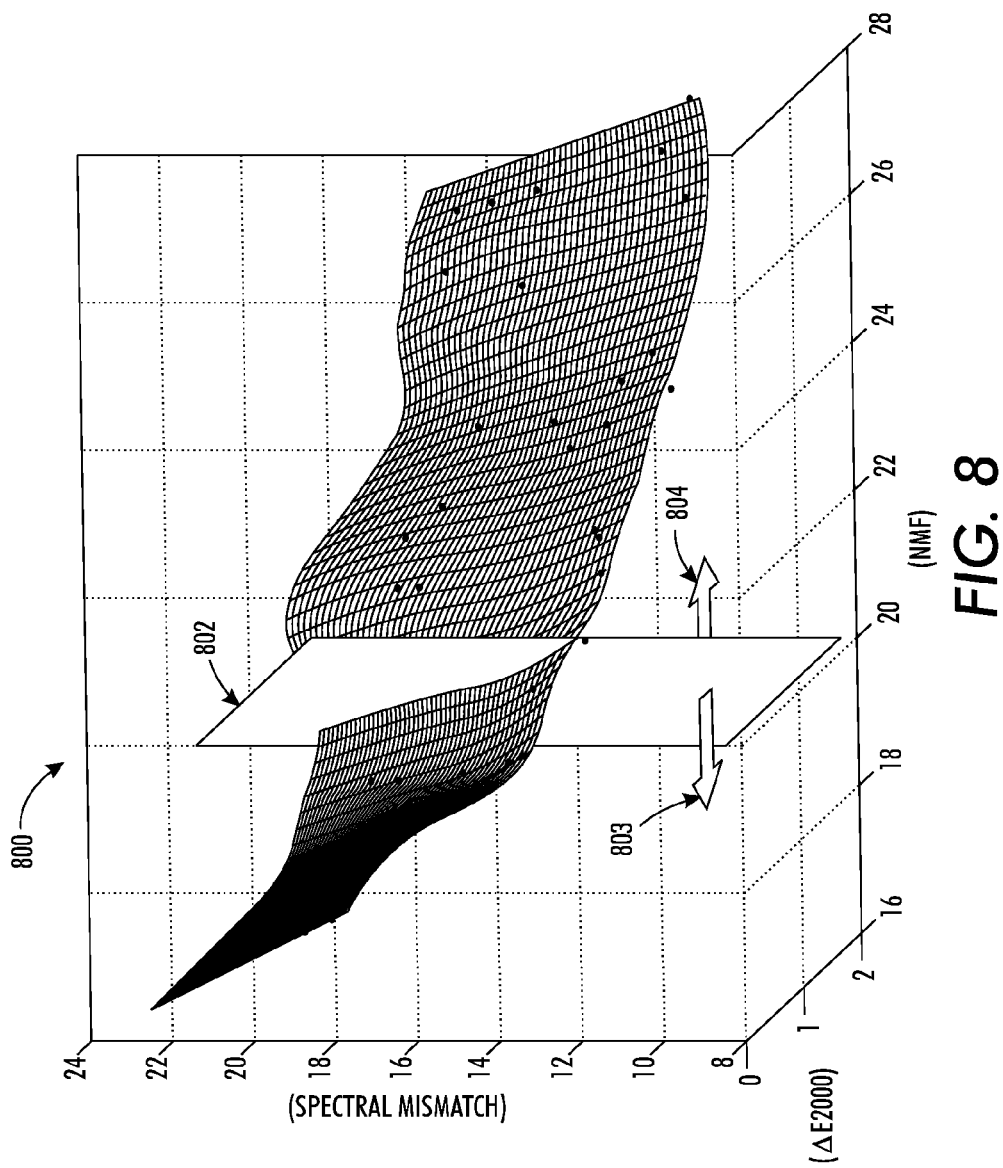
FIG. 8 is another three dimensional Pareto Front illustrating a user adjustable slideable plane for identifying a subsection of the Pareto Front containing preferred color solutions.

In various embodiments hereof, the Pareto Front is displayed on the display device for a user manipulation. The user can select one or more target points, such as target point 201 of FIG. 1, using the visual display's touchscreen. The user can also manipulate various aspects of the displayed Pareto Front such as, for instance, zoom-in, zoom-out, rotate the Pareto Front about any of the axis of the multi-dimensional objective space, add/delete/move points, and the like. The user can further drag a selected target point in any of the directions thereof as desired and physically map the target point to a desired point along the Pareto Front. The user can define a subspace of the Pareto Front by placing a slideable plane thereon, as shown in FIG. 8, and move the slideable plane along any of the dimensions thereof.

It should be understood that the displays of FIGS. 5 and 6 can be configured by software to display a wide variety of graphical widgets such as, for instance, numeric and text windows, scroll bars, dials, slideable bars, buttons, charts, plots, graphs, images, and the like. The embodiment shown is illustrative and may include any other functionality which any touchscreen known in the art is capable of displaying. Software used to configure a particular user interface to display/enter/accept data is often device-dependent and may be proprietary to a particular manufacturer. Therefore, a further discussion regarding specific software algorithms to program or otherwise configure a touchscreen device is omitted herein. Those of ordinary skilled would program their user interfaces to display selectable menus and graphical information for their document reproduction systems in their particular print/copy job environments.

Flow Diagram of an Example Embodiment

Figure 7:
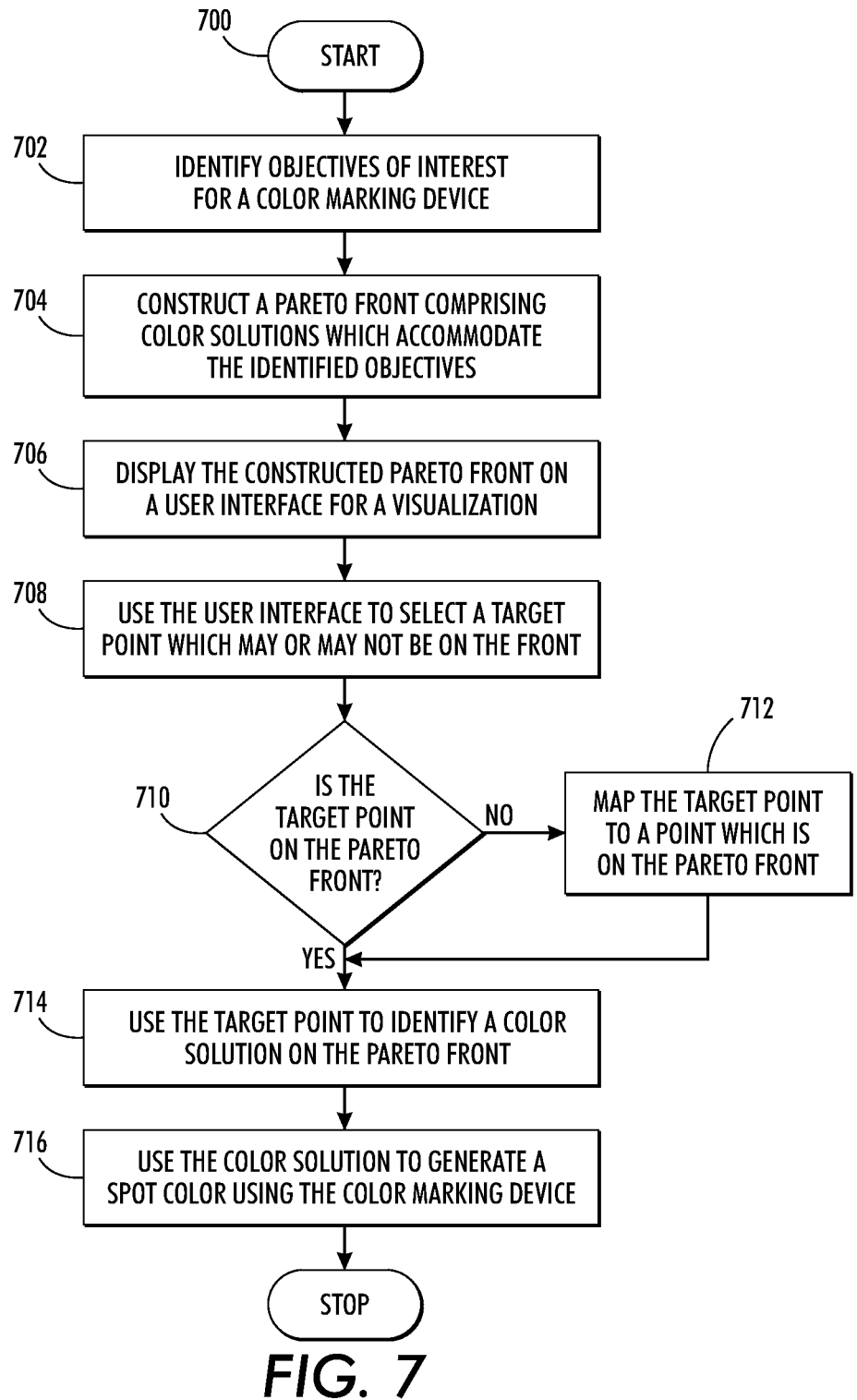
FIG. 7 is a flow diagram of one example embodiment of the present method for determining a color solution which achieves color objectives for a color marking device.

Reference is now being made to the flow diagram of FIG. 7 which illustrates one example embodiment of the present method for determining a color solution which achieves color objectives for a color marking device. The method begins at step 700 and processing immediately proceeds to step 702.

At step 702, a total of N objectives of interest are selected for a color marking device. The objectives can be identified by a user making a selection using the keyboard and mouse of the computer workstation of FIG. 3. Various menu options for defining and/or selecting objectives of interest for a given color marking device may be displayed on the UI of FIG. 5 and the user enters or chooses their desired objectives by selecting one or more of the displayed menu options and/or icons. To assist customers to incorporate their preferences on different objectives in selecting a best color solution for their respective color device, the user may be queried to additionally specify one or more desired levels with each objective such that an optimal solution can be recommended to the user based on the user input, whether the point is on the Pareto Front or not. The user may wish to use the UI to designate one or more highest tolerable values for all objectives and choose to minimize these within those tolerances. In the case of two objectives, a slideable menu option is provided for the user to distribute weights to their various objectives according to a set of user preferences with respect to a particular print/copy job requirement. The preferences are selected by the user using a plurality of adjustable graphical widgets displayed on a display device which, through an individual adjustment thereof, various weights are selectively applied.

At step 704, a N-dimensional Pareto Front is constructed which comprises a collection of color solutions which accommodate the user-identified objectives. For the purposes hereof, the Pareto Frontier comprises a multi-objective optimization of color recipes based on a printer or printer models of the identified objectives. The Pareto Front contains color solutions in the N-dimensional objective space with each color solution identifying a spot color recipe or a combination of spot color recipes and at least one process actuator. This Pareto Front of FIG. 2 can accommodate differing user-assigned weights applied to the selected objectives of interest. Such user-specified/assigned constraints on their selected objectives reflect a tolerance level of the user. For example, some users may choose to minimize a color difference $\Delta E_{2000}$, while having NMF maintained at or below a certain level. The Pareto Front is computed using a computer processor (CPU) in communication with a memory and a storage device and may be performed by any of the devices of FIGS. 3 and 4. Data values, variables, mathematical functions, and the like, which are needed as required to construct the Pareto Front, are retrieved from storage. In various embodiments, machine readable program instructions are executed upon the user having selected an icon, such as "ENTER", displayed on the menu of the UI of FIG. 5 upon completion of selecting their objectives of interest.

At step 706, the constructed Pareto Front is displayed on the touchscreen. The touchscreen display can be that of any of the devices of FIGS. 3 and 4. The Pareto Front is displayed for a user visualization, selection, and manipulating thereof. FIG. 6 shows the constructed Pareto Front (of FIG. 1) displayed on the example UI. Various points along the Pareto Front can be highlighted in different colors for the user. It should be understood that the Pareto Front of FIG. 2 is in color. One or more computer-suggested color solutions can be highlighted for the user. FIG. 2 shows several preferred color solutions PF1, PF2, and PF3, highlighted for visualization by the user.

At step 708, a target point is selected in the N-dimensional objective space of the displayed Pareto Front. The target point can be on or off the Pareto Front. FIG. 2 illustrates a user-selected target point 201 which is not on the Pareto Front. One example target point (at 201 of FIG. 2) was selected in the 3 dimensional objective space of Spectral Mismatch, Color Different, and NMF. The selection of the target point reflects the user's preferences with respect to the multi-dimensional objective space. In other embodiments as shown in FIG. 8, the user identifies a sub-section of the Pareto Front 800 by moving a user-slideable plane 802 in any of the dimensions of the displayed multi-objective space, such as directions 803 or 804 for example, and the user selects a target point which maps onto the identified sub-section of the Pareto Front. The identified sub-section contains preferred color solutions which the user wishes to explore.

At step 710, a determination is made whether the selected target point is on the Pareto Front. If not then, at step 712, the target point is mapped to a point which is on the Pareto Front. As shown by way of example in FIG. 2, selected target point 201 is mapped 202 onto the Pareto Front to point 203 using, for example, a minimum Euclidean distance criteria. The color solution which is closed to that mapped target point is the identified color solution. If the user has specified a sub-section of the Pareto Front containing preferred color solutions (as shown in FIG. 8), then the target point is mapped onto the identified sub-section. In FIG. 6, the touch capability of the display is utilized by the user to physically map the target point to a point which is on the Pareto Front using a programmable drag-and-drop feature. In such a manner, the user can physically perform their own mapping according to their own preferences to try out different color solutions.

Given the limitations of display multi-dimensional graphs in dimensions greater than three, it should be appreciated that an N-dimensional Pareto Front ($3<=N<=4$) can be projected onto either a 1- or 2-dimensional surface from which the user makes their selection. When $N>4$, color selection is performed automatically for the user based upon the user's constraints and specified weights.

Figure 9A:
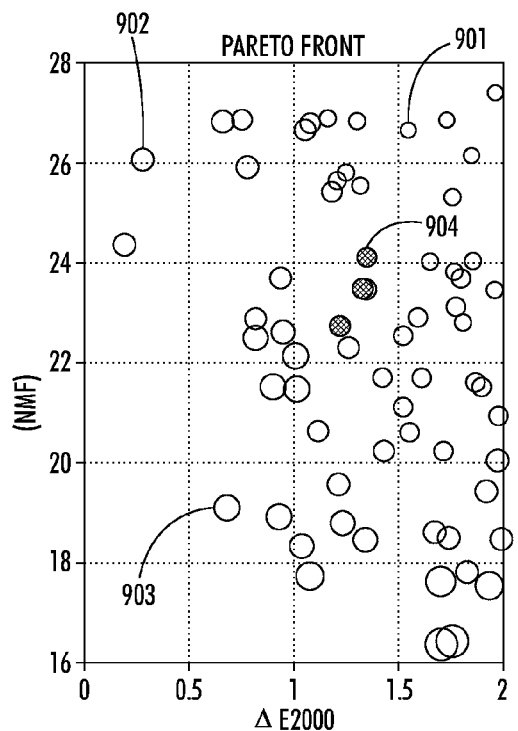
FIG. 9 shows a three dimensional Pareto Front having been projected to a two-dimensional surface to provide easy user navigation among candidate color solutions.
Figure 9B:
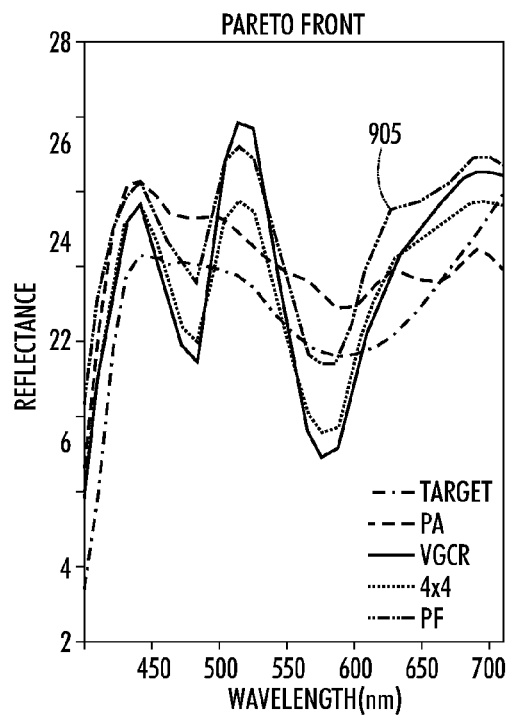

This provides easy navigation among a set of candidate solutions. FIG. 9 illustrates one such projection of a 3-dimensional Pareto Front onto a 2-dimensional surface. The "color solution" circles of FIG. 9A (shown as example circles 901, 902, 903 and 904) on the $\Delta E_{2000}$-NMF surface have different radii. The radius of each circle corresponds to the magnitude of their spectral criterion based on model predictions. VGCR refers to Variable GCR and 4×4 refers to a 4-to-4 optimization approach. These two approaches were developed to reduce NMF. PF refers to a solution on the Pareto front. FIG. 9B shows an example spectra corresponding to a selected circle 904 is shown at line 905 and labeled PF. The reflectance spectra corresponding to circle 904 is displayed for the user to help the user better predict a visual outcome of a given selected color solution recipe. The user can interactively select and view the predicted spectra of different color solution "circles" by performing a mouse-over operation on any circles of the projection of FIG. 9A, or by touching a particular circle using the capabilities of the touchscreen display and viewing the individual spectra thereof before deciding on an optimal recipe according to their own preferences. It should be appreciated, at this point, that the reflectance spectra is being displayed because it is one of the objectives of interest in the example Pareto Front of FIG. 2. Other graphs of other predicted results, including results of historical records, can also be displayed in such a manner depending on the selected objectives.

At step 714, the mapped target point identifies a particular color solution. As shown in the Pareto Front of FIG. 2, mapped target point 203 identifies color solution (PF2). As discussed with respect to the display of FIG. 6, the user may physically map a target point to a point which is on the Pareto Front or simply select another target point.

Once the color solution has been identified, at step 716, the identified color solution is used to generate a spot color. The generated spot color achieves the user-selected preference. In another embodiment, the color solution comprises a spot color recipe and one or more process actuators. As described herein with respect to FIG. 10, device configuration settings are retrieved from records contained in a database and the multi-function device, such as the system of FIG. 4, is automatically configured based on the retrieved configuration settings. The retrieved device configuration settings may be displayed on a user interface for review and acceptance. Once the color marking device has been configured and the spot color printed, in this embodiment, further processing stops.

One of ordinary skill in this art would appreciate that a first test patch should be printed of the generated spot color using the color marking device. The printed first test patch is associated with the color solution associated with the target point. A plurality of target points should be selected and each mapped to a respective point on the Pareto Front. Each of the mapped target points identifies a respective color solution. Each of the spot colors is printed using the color marking device and color measurements obtained therefrom. The obtained measurements would then be compared to color values of other printed spot colors and one of the color solutions would be selected as a preferred color solution based upon a result of the comparisons.

Figure 10:
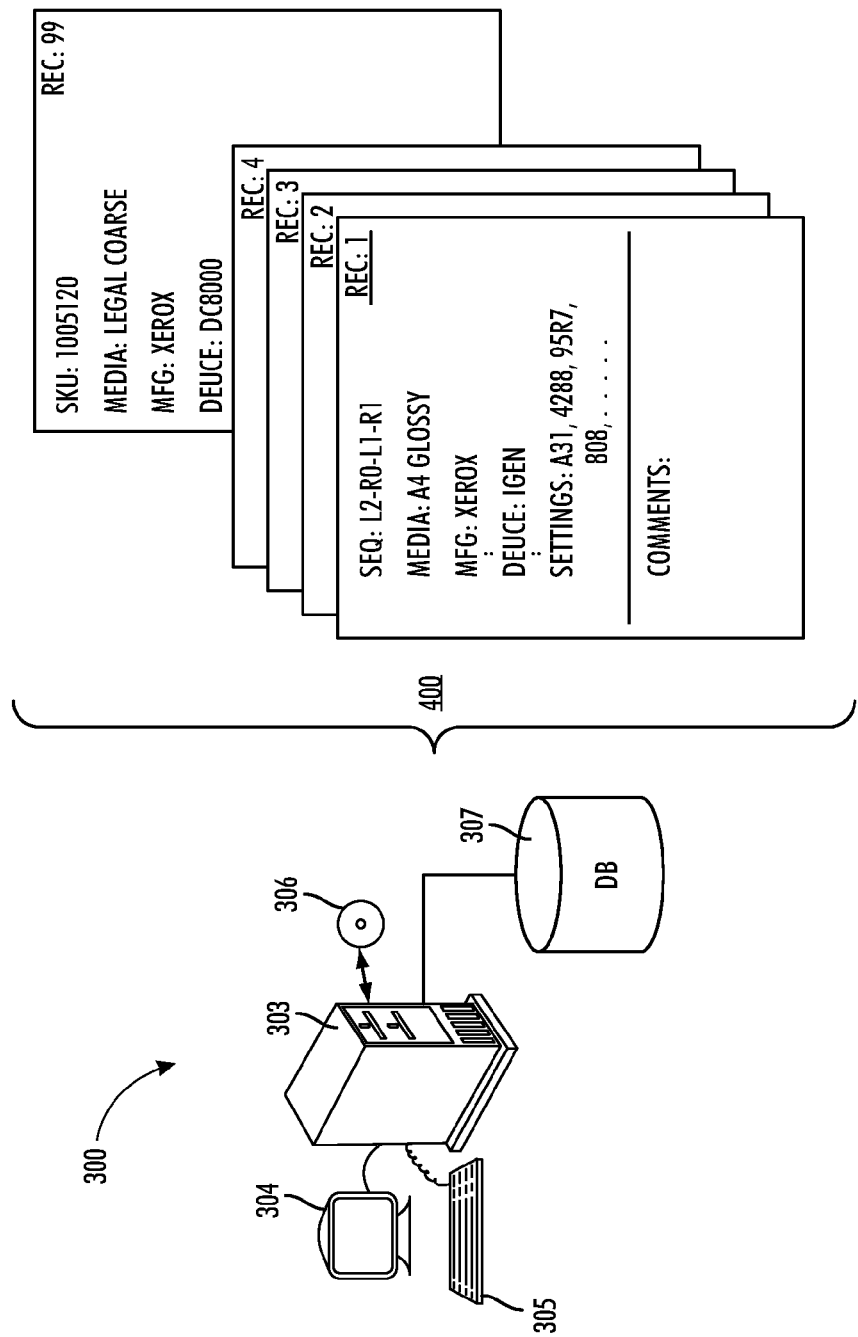
FIG. 10 shows an example database of records containing device configuration settings.

Reference is now being made to FIG. 10 which illustrates a plurality of indexed retrievable records stored in the database 307 of workstation 300. The computer readable medium 306 is for loading/off-loading records to/from the database. The database computer system includes a communications interface (not shown) which acts as both an input and an output to allow software and data to be transferred to external devices. Database 307 is one known in the art which is capable of indexing a plurality of records, receiving and interpreting a query, and retrieving one or more of the appropriate records in response to the query. The database is also capable of adding new records and updating existing records already stored. Since database construction, optimization, indexing, and record retrieval techniques are well known in the art, a further discussion as to a specific database implementation is omitted herein. One of ordinary skill would be able to store, index, and retrieve a matching record containing one or more system settings and provide the same in response to a query over a network such as the internet. It should also be understood that the information contained in any of the records shown in FIG. 10, or any of the display screens provided herewith, is merely for explanatory purposes. For instance, the SKU number of the records pertains to no specific device. Any relation to an actual device is purely coincidental. Likewise, the sequence of alphanumeric codes provided in the "settings" field such as: A31, 42BB, 95R7, and B08 of the first record shown are illustrative and intended to represent codes which might be retrieved, decoded, interpreted, and understood by a controller of, for example, the color marking device 500 of FIG. 5. System controllers would configure the color marking device based on the system setting codes. Text strings can be easily retrieved from a local storage medium and associated with the system setting codes such that the appropriate text message can be displayed in the appropriate language on the system settings display portion of a user interface for an operator. Systems settings pertaining to any print system device and any type of data structure for a database record can be utilized.

Performance Results

Figure 13:
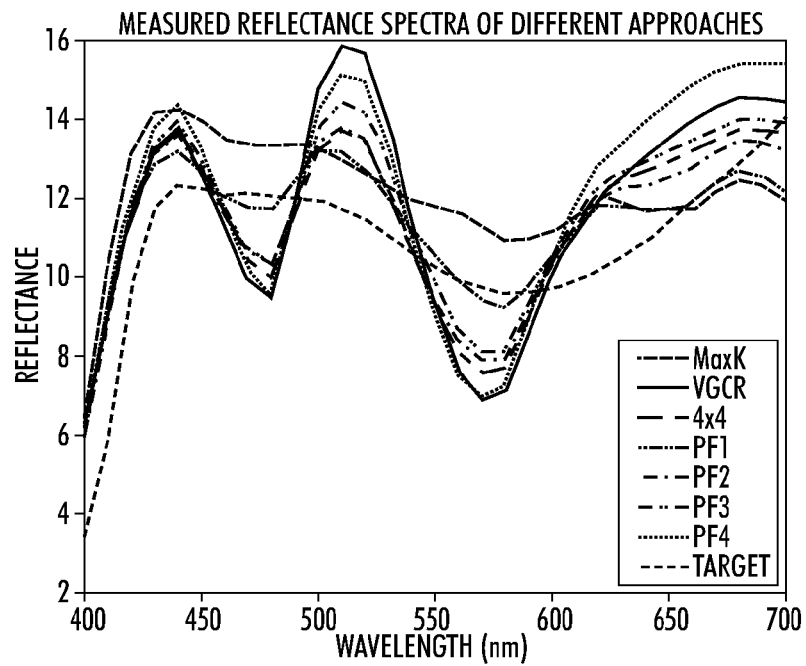
FIG. 13 shows the spectral measurements from recipes for one of the printed colors compared to the existing approaches.
Figure 14:
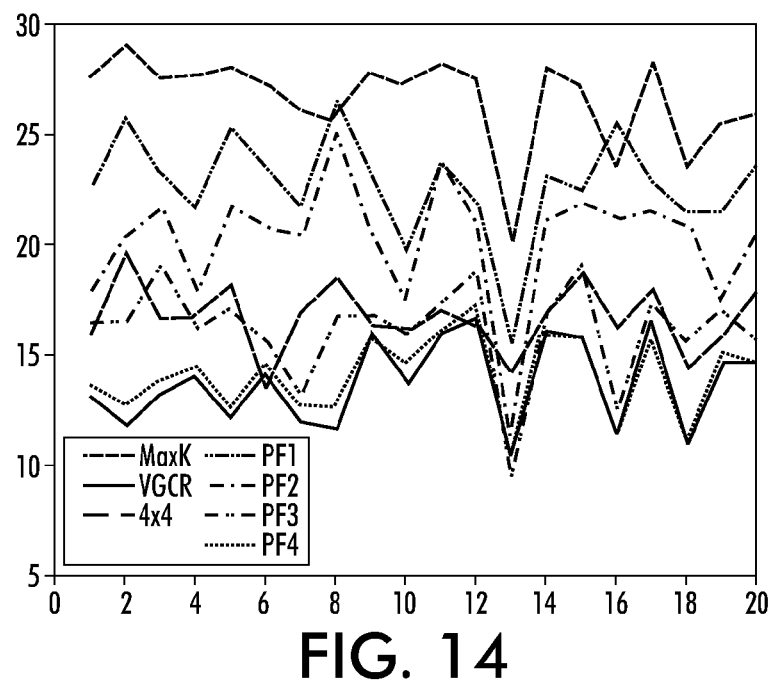
FIG. 14 shows the NMF measurement to illustrate the point that the first set of recipes (PF1) from the Pareto Front generated prints that were visually the same as the Max-K recipes in terms of color match, while being noticeably smoother.

Test patches were printed to show the effectiveness of spectral matching and to illustrate the trade-offs between visual color match and smoothness along the Pareto Front. A total of twenty spot colors were identified (from past experiments) as not having ideal visual color match when smoothness was enforced by VGCR (Variable GCR) and 4-to-4 optimization (prior art methods). These colors are typically close to the neutral axis, as the Table 1 of FIG. 11 shows. Four points from the Pareto Front were selected to illustrate different levels of trade-offs between spectral match and smoothness. A first selected optimal solution (PF1) minimizes the spectral criterion. The forth solution (PF4) minimizes NMF number. The second (PF2) and third (PF3) solutions were selected somewhere in between these two recipes. Table 2 shows the average $\Delta E_{2000}$ and NMF values across the 20 spot colors. Color recipes were selected based upon the aforementioned criteria using a printer model. These initial recipes were modified, where necessary, by a control algorithm that iterated several times in order to match the target $L^*a^*b^*$ values shown in Table 1 of FIG. 11. The final $\Delta E_{2000}$ are shown in Table 2 of FIG. 12. FIG. 13 shows the spectral measurements from these recipes for one of the printed colors compared to the existing approaches. FIG. 14 shows the NMF measurement. The first set of recipes (PF1) from the Pareto Front generated prints that were visually the same as the Max-K recipes in terms of color match, while being noticeably smoother. On the other hand, the Pareto solutions achieved the same level of smoothness as the Variable GCR approach. Clearly, the Pareto Front provided a range of candidate recipes for different user preferences of smoothness versus visual color match.

Example Color Solution Identification System

Figure 15:
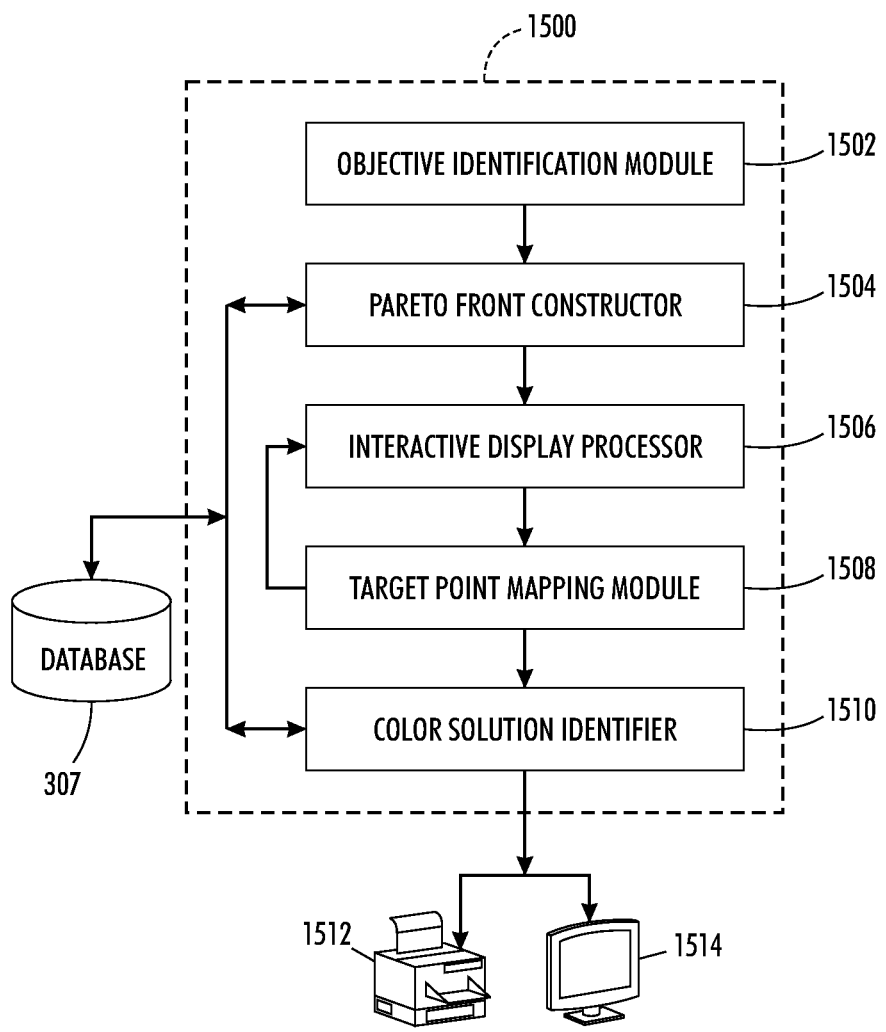
FIG. 15 shows a block diagram of one example system for color solution identification which implements various aspects of the methods hereof as shown and discussed with respect to the flow diagram of FIG. 7.

Reference is now being made to FIG. 15 which shows a block diagram of one example system 1500 which implements various aspects of the methods hereof for color solution identification as shown and discussed with respect to the flow diagram of FIG. 7.

Objective Identification Module 1502 facilitates the user-selection or identification of a total of N objectives of interest for a given color marking device. Pareto Front Constructor Module 1504 receives the objectives of interest from Module 1502 and constructs a N-dimensional Pareto Front. The Pareto Front contains color solutions in the N-dimensional objective space with each color solution identifying a spot color recipe or a combination of spot color recipes and at least one process actuator. Constructor 1504 may retrieve/store various aspects of the Pareto Front to storage device 307. Interactive Display Processor 1506 is in communication with Constructor 1504 and displays the constructed Pareto Front on a display device for a user interaction therewith. Such a module may interact with one or more functions and/or capabilities of the display devices of FIGS. 5 and 6. The Pareto Front is displayed for a user visualization, selection, and manipulating thereof. Display Processor 1506 effectuates a user selection of the target point via an interaction with the user. The selection of the target point reflects the user's preferences with respect to the multi-dimensional objective space. The target point can be on or off the Pareto Front. In other embodiments, the user identifies a sub-section of the Pareto Front by moving a user-slideable plane in any of the dimensions of the displayed multi-objective space and the user selects a target point which maps onto the identified sub-section of the Pareto Front. Target Point Mapping Module 1508 receives the selected or identified target point from Processor 1506 and proceeds to determine whether the selected target point requires a mapping to a point which is on the Pareto Front. If the selected target point is not on the Pareto Front then the target point is mapped to a point which is on the Pareto Front. If the user has specified a sub-section of the Pareto Front containing preferred color solutions then the target point is mapped onto the identified sub-section. Mapping Module 1508 may further perform a projection of the N-dimensional Pareto Front onto a 1- or 2-dimensional surface from which the user makes their selection, as discussed herein with respect to FIGS. 9A-B. Color Solution Identifier 1510 receives the mapped target point and proceeds to identify the associated color solution, as discussed with respect mapped target point 203 and color solution PF2 of FIG. 2. Identifier Module 1510 may further retrieve device configuration settings from database 307 of FIG. 10. Once the color solution has been identified, the color solution is provided to color marking device 1512 whereon the spot color is generated. The color solution is optionally provided to display 1514. Device 1512 may be any of the multi-function devices of FIGS. 3 and 4 and display 1514 may be any of the displays associated with any of the illustrated devices. The generated spot color achieves the user-selected preference. Any of the modules and processing units of FIG. 15 can be placed in communication with database 307 and may store/retrieve therefrom data, variables, records, parameters, functions, machine readable/executable program instructions required to perform their intended functions. Moreover each of the modules of system 1500 may be placed in communication with one or more devices over a network via pathways (not shown). Some or all of the functionality for any of the modules of system 1500 may be performed, in whole or in part, by components internal to workstation 300 or by a special purpose computer system.

Various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Figure 16:
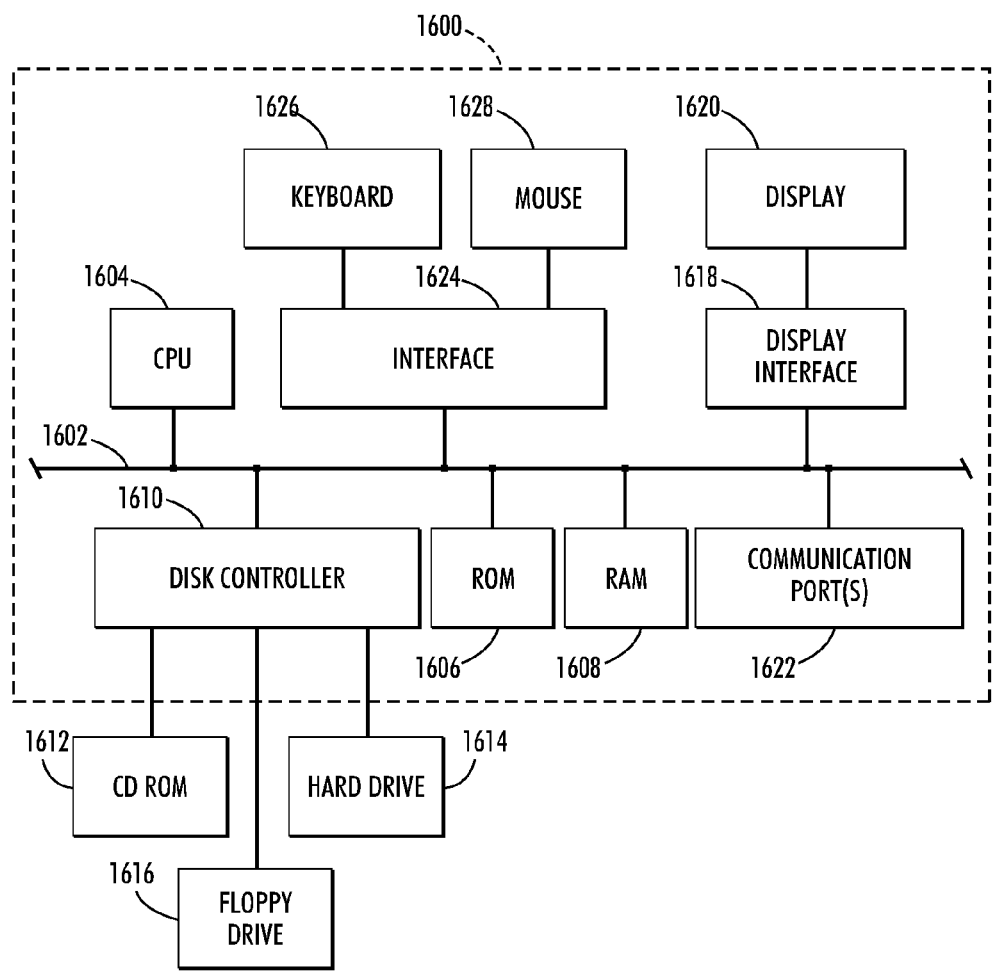
FIG. 16 illustrates a block diagram of one example special purpose computer 1600 for implementing one or more aspects of the present method as described with respect to the flow diagram of FIG. 7, and the modules and processing units of the block diagram of FIG. 15.

Reference is now being made to FIG. 16 which illustrates a block diagram of one example special purpose computer 1600 for implementing one or more aspects of the present method as described with respect to the flow diagram of FIG. 7, and the modules and processing units of the block diagram of FIG. 15. Such a special purpose processor is capable of executing machine executable program instructions and may comprise any of a micro-processor, micro-controller, ASIC, electronic circuit, or any combination thereof. In FIG. 16, communications bus 1602 is in communication with a central processing unit (CPU) 1604 capable of executing machine readable program instructions for performing any of the calculations, comparisons, logical operations, and other program instructions for performing any of the steps described above with respect to the flow diagrams and illustrated embodiments hereof. Processor 1604 is in communication with memory (ROM) 1606 and memory (RAM) 1608 which, collectively, constitute example storage devices. Such memory may be used to store machine readable program instructions and other program data and results to sufficient to carry out any of the functionality described herein. Disk controller 1610 interfaces with one or more storage devices 1614 which may comprise external memory, zip drives, flash memory, USB drives, or other devices such as CD-ROM drive 1612 and floppy drive 1616. Storage device stores machine executable program instructions for executing the methods hereof. Such storage devices may be used to implement a database wherein various records are stored. Display interface 1618 effectuates the display of information on display 1620 in various formats such as, for instance, audio, graphic, text, and the like. Interface 1624 effectuates a communication via keyboard 1626 and mouse 1628, collectively a graphical user interface. Such a graphical user interface is useful for a user to enter information about any of the displayed information in accordance with various embodiments hereof. Communication with external devices may occur using example communication port(s) 1622. Such ports may be placed in communication with any of the example networks shown and described herein, such as the Internet or an intranet, either by direct (wired) link or wireless link, as shown and discussed with respect to the networked configuration of FIG. 3. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for determining a color solution which achieves color objectives for a color marking device, the method comprising:
    identifying N objectives for a color marking device, said objectives comprising at least two of: visual color match, graininess, mottle, color stability, metamerism, ink cost, color difference, and spectral match;
    constructing a 3-dimensional Pareto Front using an optimization process based upon printer models of said identified N objectives, said Pareto Front being such that various color solutions displayed along a frontier of said Pareto Front are Pareto optimal, said color solutions comprising at least one of: process colors used to emulate a spot color and a set of device configuration settings comprising process parameters and process set points for said color marking device, said Pareto Front identifying collections of Pareto optimal color solutions which accommodate said objectives instead of a single optimal color solution;
    in response to having constructed said Pareto Front, displaying at least a portion of said Pareto Front in a 3-dimensional representation on a graphical display such that said various collections of Pareto optimal color solutions can be visualized;
    placing a slideable plane on said displayed portion of said Pareto front;
    moving said slideable plane along at least one dimension of said 3-dimensional representation to identify a sub-section of said Pareto Front which contains preferred color solutions;
    selecting, by a user, a target point on said 3-dimensional Pareto Front from a set of N objectives which map onto said identified sub-section of said Pareto Front, said selection being based upon at least one user preference;
    identifying a Pareto optimal color solution on said Pareto Front that is associated with said selected target point; and
    using said identified Pareto optimal color solution to generate a spot color for said color marking device, said generated spot color simultaneously achieving said user-selected preference while accommodating said identified objectives.

2. The method of claim 1, further comprising said user manipulating said Pareto Front displayed on said graphical display, said manipulation comprising any of:
    zooming-in, zooming-out, dragging said target point in a desired direction along said Pareto Front, rotating said Pareto Front about an axis, and in response to said target point not being on said Pareto Front, mapping said target point to a point which is on said Pareto Front.

3. The method of claim 1, wherein said preferences are selected by said user using a plurality of adjustable graphical widgets displayed on a graphical display device which, through an individual adjustment thereof, various weights are applied to said objectives, said identified target point comprising a compilation of said variously weighted objectives.

4. A system for determining a color solution which achieves color objectives for a color marking device, the system comprising:
    a graphical display device;
    a memory; and
    a processor in communication with said memory and said graphical display, said processor executing machine readable instructions for performing the method of:
        retrieving, from said memory, N objectives for a color marking device, said objectives comprising at least two of: visual color match, graininess, mottle, color stability, metamerism, ink cost, color difference, and spectral match;
        constructing a 3-dimensional Pareto Front using an optimization process based upon printer models of said identified N objectives, said Pareto Front being such that various color solutions displayed along a frontier of said Pareto Front are Pareto optimal, said color solutions comprising at least one of: process colors used to emulate a spot color and a set of device configuration settings comprising process parameters and process set points for said color marking device, said Pareto Front identifying collections of Pareto optimal color solutions which accommodate said objectives instead of a single optimal color solution;
        in response to having constructed said Pareto Front, displaying at least a portion of said Pareto Front in a 3-dimensional representation on said graphical display device such that said various collections of Pareto optimal color solutions can be visualized;
        placing a slideable plane on said displayed portion of said Pareto front;
        moving said slideable plane along at least one dimension of said 3-dimensional representation to identify a sub-section of said Pareto Front which contains preferred color solutions;
        selecting, by a user, a target point on said 3-dimensional Pareto Front from a set of N objectives which map onto said identified sub-section of said Pareto Front, said selection being based upon at least one user preference;
        identifying a Pareto optimal color solution on said Pareto Front that is associated with said selected target point; and
        using said identified Pareto optimal color solution to generate a spot color for said color marking device, said generated spot color simultaneously achieving said user-selected preference while accommodating said identified objectives.

5. The system of claim 4, further comprising said user manipulating said Pareto Front displayed on said graphical display, said manipulation comprising any of: zooming-in, zooming-out, dragging said target point in a desired direction along said Pareto Front, rotating said Pareto Front about an axis, and in response to said target point not being on said Pareto Front, mapping said target point to a point which is on said Pareto Front.

6. The system of claim 4, wherein said preferences are selected by said user using a plurality of adjustable graphical widgets displayed on a graphical display device which, through an individual adjustment thereof, various weights are applied to said objectives, said identified target point comprising a compilation of said variously weighted objectives.

7. The method of claim 1, wherein said constructing said 3-dimensional Pareto Front includes constructing said 3-dimensional Pareto Front using a genetic algorithm.

8. The system of claim 4, wherein said constructing said 3-dimensional Pareto Front includes constructing said 3-dimensional Pareto Front using a genetic algorithm.

* * * * *